July 4, 1939.   A. O. PRICE   2,164,721
SUSTAINING AND PROPULSIVE MEANS FOR AIRCRAFT
Filed Dec. 8, 1934
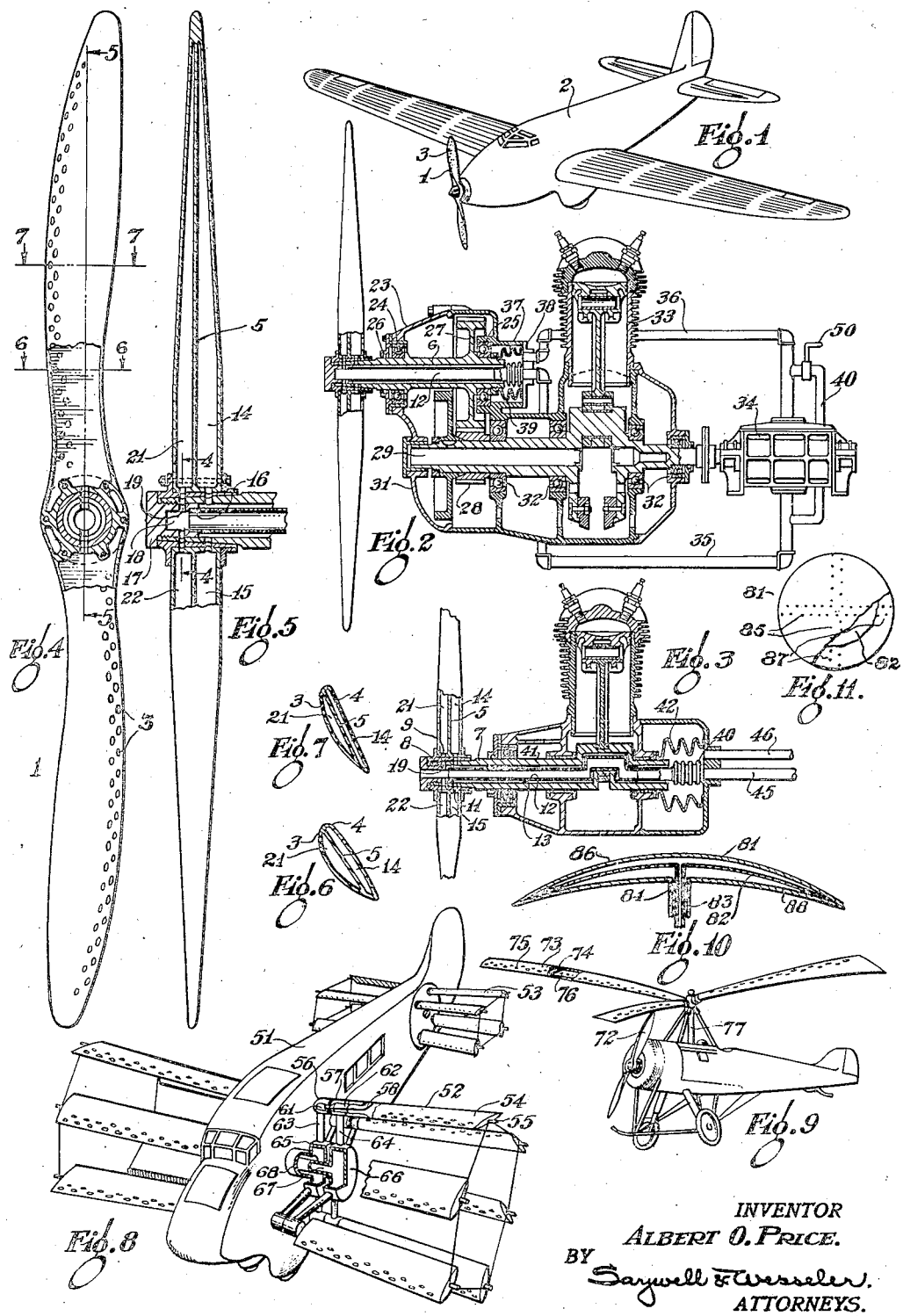
INVENTOR
ALBERT O. PRICE.
BY Saywell & Wesseler
ATTORNEYS.

Patented July 4, 1939

2,164,721

UNITED STATES PATENT OFFICE 2,164,721

SUSTAINING AND PROPULSIVE MEANS FOR AIRCRAFT

Albert O. Price, Leesville, Ohio

Application December 8, 1934, Serial No. 756,608

5 Claims. (Cl. 244—40)

This invention, as indicated, relates to apparatus for sustaining and propulsive means for aircraft. More particularly, it comprises means to eliminate or reduce the effects of the boundary layer of air which affects the efficient operation of propelling means for aircraft, and to give positive directive and propulsive air control. The invention also includes the method of inducing low and high pressure effects singly or in combination in association with prropulsive effects.

In applicant's prior patent, No. 1,957,413, granted May 1, 1934, apparatus is disclosed which utilizes air drawn from various surfaces of an aircraft and discharged from other surfaces thereof to bring about predetermined effects in the propulsion and control of such aircraft.

In the present invention, the utilization of a suction of low pressure effect over one portion of a propelling element and a jet or high pressure effect over another portion thereof, or various combinations of such low and high pressure effects, is provided for. Various advantages are thus realized through the increase of the operative efficiency of the various propelling units, including the reduction in the amount of slippage, the adding to the vacuum or low pressure effect over the forward or upper surfaces of the propelling means, and positive propulsive and directional control.

Where a standard type airplane is equipped with propellers embodying the invention herein, the effects of boundary air and eddy currents acting disadvantageously to the forward propulsion of the aircraft are greatly reduced and far higher efficiency is attained. Where large relatively slow moving propulsive or sustaining elements are used on aircraft, as the large blades of the paddle-wheel type of aircraft, or the large blades of helicopter and like devices, or the rotor blades of aircraft known as "autogyros", the low pressure effect over the upper surfaces is greatly increased and at the same time through the discharge of compressed air through the structure a positive propulsive action is secured. A certain amount of heat is transferred to the compressed air and this heat is transmitted to the propulsive elements and the associated structures which serves to keep the same free of the accumulation of snow or ice when conditions would otherwise result in their adherence. Through the use of suitable valves the amount of air intake over one surface of the propelling means and air discharge over another area of the propelling means may be varied through all the various combinations and may reach a maximum of one factor and include the elimination of the other factor should such adjustment be required for purposes of propulsion or control under certain circumstances.

The invention is of broad aspect and while it has been shown and described with certain types of aircraft, it is by no means to be limited thereto, and it may be applicable to lighter than air devices as well as to certain types of land and water vehicles, wherein only a partial propulsive or sustaining effect is sought for. The chief use of the invention, however, relates to the heavier than air type of aircraft.

To the accomplishment of the foregoing and related ends, said invention, then, consists of the means and method hereinafter fully described and particularly pointed out in the claims, the annexed drawing and the following description setting forth in detail certain means and methods embodying the invention, such disc'osed means and method constituting, however, but several of various forms in which the principle of the invention may be used.

In said annexed drawing:

Figure 1 is a perspective view of an aircraft embodying the principles of the invention;

Figure 2 is a central vertical sectional view, partly in section, showing an engine, a positive air displacement apparatus, and a propeller and transmission embodying the principles of the invention;

Figure 3 is a fragmentary central vertical sectional view showing an engine and propeller embodying the principles of the invention, the propeller being mounted directly on the engine shaft;

Figure 4 is a top plan view, partly in section, showing a propeller embodying the principles of the invention;

Figure 5 is a side elevation, partly in section, of the propeller shown in Figure 4;

Figure 6 is a transverse sectional view, taken along the line 6—6, shown in Figure 4, looking in the direction of the arrows;

Figure 7 is a transverse sectional view of the propeller shown in Figure 4, taken along the line 7—7, looking in the direction of the arrows;

Figure 8 is a perspective view, partly in section, illustrating a paddle-wheel type of aircraft embodying the principles of the invention;

Figure 9 is a perspective view of an autogyro type of aircraft embodying the principles of the invention;

Figure 10 is a sectional view, partly broken away, showing a modified form of sustaining or propeller element; and Figure 11 is a diagrammatic top plan view of the device shown in Figure 10.

The aircraft illustrated in the drawing may embody various types, including the substantially standard type of aeroplane shown in Figure 1, or the paddle-wheel type of aircraft shown in Figure 8, or the autogyro type of aircraft shown in Figure 9. It may also include other types than those illustrated, the principle of the invention being to provide the propellers, paddle members, or sustaining rotor blades of an autogyro, or one or more of such devices in a single aircraft, with means designed to give such propelling and sustaining elements an increased efficiency and to assist through air control in sustaining or in propelling or steering the air craft. This is brought about through the utilization of low pressure or high pressure effects, or various combinations of such low and high pressure air, in association with the propelling means.

The aircraft shown in Figure 1 may be equipped with mechanism of the type shown in Figures 2 and 3, wherein the propeller 1 mounted at the forward end of the aeroplane body 2 is provided with a series of apertures 3 on one side of a partition and, as shown more particularly in Figures 6 and 7, is provided with a similar series of apertures 4 on the other side of a partition 5 extending centrally through the propeller structure on either side of the hub thereof.

The hollow interior of the propeller is thus divided into four chambers of substantially equal capacity by the central partition members 5 and the outer walls of said chambers are perforated, as will be hereinafter explained, to permit the admission and discharge of air through such chambers. The partitions 5 extend transversely of the aircraft and transversely of the propeller structure across its widest diameter, but the partitions may in special cases be otherwise inserted within the propeller structure and may extend at right angles to the positions shown, in certain cases where special effects are to be produced.

In the form illustrated in Figure 2, the propeller is mounted upon a shaft comprising a sleeve 6, having a tapered forward end 7 over which the tapered hub 8 of the propeller engages, said hub being formed with passageways 9 adapted to register with passageways 11 through the tapered portion of the sleeve. A tubular member 12 is engaged within the hollow sleeve and extends for substantially the entire length thereof, with its outer wall in spaced relation to the inner wall of the sleeve so as to provide a passageway 13 around the tubular member for conveying air to one pair of the compartments in the propeller, in the instance shown, the connection being with the inner compartments 14, 15, which are provided with a series of apertures 4. The inner tube 12 is engaged at its forward end within a countersunk recess 16 formed at the inner end of a plug 17 having a central chamber 18 communicating through passageways 19 with the outer compartments 21, 22 on the opposite sides of the partitions 5 to the inner compartments 14, 15 heretofore referred to.

The sleeve 6 forming the shaft of the propeller, in the form of construction shown in Figure 2, is supported in a transmission housing 23, and suitable journal bearings 24, 25 and thrust bearings 26 are provided on said shaft and housing to provide free operation of the propeller. A gear 27 is secured to the shaft 6 and enclosed within the transmission housing, such gear being driven by a pinion 28 mounted on the engine shaft 29 which is housed within the engine casing 31 provided immediately beneath the transmission housing above described and preferably formed integrally therewith. The engine shaft is suitably journaled in the engine housing having a series of ball bearings 32 on either side of the crank shaft. The engine cylinders 33 are preferably radially disposed around the engine housing, only one cylinder, however, being indicated in the drawing. The engine shaft is connected at its rearward end with a positive displacement pump 34, that illustrated being of the type known as the Roots blower.

The Roots blower is provided with an intake passageway 35 and an outlet passageway 36. A by-pass passageway 40 is provided, controlled by a valve 50, whereby either intake or outlet passageway may be connected or disconnected in whole or in part and any desired proportionate regulation between the air within the passageways 35 and 36 can be accomplished through the control of said valve. The inlet passageway 35 connects with the rearward end of the tubular member 12 heretofore described which in turn is connected through the passageways 9 and 19 with the outer compartments 21, 22. The connection between the rotating tubular member 12 and the stationary passageway 35 is made by means of a metal bellows connecting member 37 which is held in tight running engagement with the end of said tubular member by means of the end plate 38 of the transmission housing. A similar connection is made with the output passageway 36 by means of the metal bellows 39 which is held pressed against the end portions of the sleeve 6 by means of the end plate 38 of the transmission housing. Thus, when the unit shown in Figure 2 is in operation, the propeller will be rotated at suitable speed for propelling the aircraft through the air and at the same time the positive displacement blower will be rotated so as to cause air to be taken in through the aperture 3 in the forward or negative pressure side of the blade and thence through the chambers 21, 22 into the tubular member 12 and thence through the bellows 37 into the low pressure passageway 35 to the positive displacement apparatus 34, the air thence being transferred to the pressure side of said apparatus and being discharged through the passageway 36, the metal bellows 39, the annular air space 13 around the sleeve 12, through the passageways 11 and 9 into the compartments 14 and 15 on either side of the propeller, and thence discharging through the apertures 4 on the rearward or positive pressure side of the propeller.

In the form of construction shown in Figure 3, substantially the same propeller and securing parts are shown as are shown in Figure 2, but in the construction shown in Figure 3, the propeller is mounted directly on the engine shaft 41 and there is no transmission or transmission housing. The rearward end of the hollow propeller shaft 41 is engaged by the metal bellows 42 and the rearward end of the inner tubular member 43 is engaged by the metal bellows 44. The suction line 45 leads to a positive displacement apparatus, and the return line 46 from such apparatus carrying the compressed air leads through the metal bellows 42 into the interior of the hollow shaft 41 and thence to the compartments 14, 15, as heretofore explained in connection with the showing in Figure 2.

The invention, as stated, is not only applicable to standard types of propellers but may be applied to the blades of paddle-wheel type of aerial apparatus 51, such as is shown in Figure 8. The body portion of such apparatus is provided with a pair of paddle-wheels 52 at its forward end and a secondary pair of paddle-wheels 53 at its rearward portion. The paddle blades are shown as six in number in the forward pair and as four in number in the rearward pair. Each paddle blade 54 is preferably of aerofoil cross section and is mounted on a shaft 55 whereby it may receive suitable feathering action as it rotates. Each of the shafts 55 is supported in a pair of suitable journals 56, 57, adjacent its inner end and is formed adjacent said end with inner and outer sleeves 61, 62 suitably perforated so as to permit the suction and compression air to be distributed to the upper and lower sides of a transverse partition 58 and thus conduct suction air from the upper side of such partition and pressure air to the lower side of such partition so as to bring about the improved operating effect of such blades in accordance with the action heretofore described in connection with the preferred type of apparatus.

The journal bosses 56, 57 communicate by means of conduits 63, 64 with enlarged hub members 65, 66, the hub member 66 communicating with an inner tubular member 67 and thence to the intake side of the positive displacement apparatus and the hub member 65 communicating with a sleeve 68 surrounding the tubular member 67 and communicating with the pressure side of the positive displacement apparatus. Thus suction air can be arranged for over the upper surface of each of the blades of the paddle-wheel and pressure air beneath the surfaces of such blades, and in this manner the most effective action can be induced throughout the apparatus. The connections with the positive displacement apparatus may be through valves (not shown) whereby regulation of the amount of suction or pressure may be brought about and the most efficient action of the entire apparatus secured in this manner.

In Figure 9 is illustrated an aircraft of the type known as the autogyro 71 wherein the propeller 72 may be similar to the propeller shown in Figures 2 and 3 and wherein the sustaining blades of the rotor 73 may likewise be formed with transverse partitions 74 on the upper side of which perforations 75 permit the withdrawal of suction air and on the lower side of which perforations 76 permit the discharge of pressure air. Suitable connections for carrying the pressure and suction air lines to the several rotor blades will be made through the central column 77 of the aircraft, such connections utilizing a pair of telescopic sleeve members having hub bosses adjacent their end portions to permit the free rotation of the parts.

In place of the rotor having independent blades such as are shown in Figure 9, an umbrella type of revolving element may be utilized for either sustaining effect or propulsive action in any desired direction by forming the rotating member in the manner illustrated somewhat diagrammatically in Figures 10 and 11, wherein a circular member 81 having a convex upper and concave lower surface is divided centrally by means of a partition 82 and is mounted upon a shaft 83 spaced from an internal tubular member 84 whereby suction air may be carried through said inner member 84 after being drawn through the openings 85 in the top wall of the upper chamber 86 of the device, and wherein pressure air may be discharged from the openings 87 in the bottom wall of the lower chamber 88 of the structure.

The openings 85 and 87 in the top and bottom walls of the member 81 are preferably arranged radially and a number of rows of radial perforations may be provided, each having evenly spaced rows of perforations running from the hub of the member to its periphery. If desired, the perforations on the under side of the member may be arranged differently from those on the upper side, and may be uniformly distributed over the entire lower surface instead of being arranged in rows.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. An apparatus of the character described with a body and a motor supported thereon, having in combination bladed propelling means for aircraft, at least one of said blades having at least two surfaces, one of said surfaces provided with openings to admit air into the interior of said propelling means, and positive displacement means to withdraw boundary air through said openings and to discharge such air from said aircraft.

2. An apparatus of the character described, having in combination a sustaining element for aircraft having a plurality of hollow blades with a partition intermediate the upper and lower surfaces thereof, apertures through said upper and lower surfaces, conduits connected with the spaces respectively above and below said partition, said conduits being formed within the supporting structure for said blades, means for independently turning each of said blades to any desired position of adjustment, means at the opposite ends of said conduits for carrying said conduits through a common support for all of said blades, and means for producing low pressure and high pressure air conditions and controlling the supply of said pressures respectively to said conduits.

3. An apparatus of the character described having in combination an aircraft structure, a motor supported thereon, bladed propelling means for said aircraft at least one blade of such means having at least two surfaces, one of said surfaces provided with openings to admit air into the interior of the propelling means, and positive displacement means to withdraw constant volumes of boundary air through said openings irrespective of speed and pressure variations and to discharge such air from said aircraft.

4. An apparatus of the character described having in combination an aircraft structure, a motor supported thereon, bladed propelling means for said aircraft having at least two oppositely positioned blades, each blade having at least two surfaces, one of said surfaces provided with openings to admit air into the interior of the propelling means, positive displacement means to withdraw boundary air through said openings, and to discharge such air from said aircraft, and means for turning each of said blades at an angle around its longitudinal axis.

5. An apparatus of the character described having in combination an aircraft structure, a motor supported thereon, a propeller having blades with a longitudinal passageway therein, apertures in at least one surface of said blades communicating with said longitudinal passageways, a positive displacement pump for producing low pressure air conditions, passageways connecting said pump with the passageways in said blades, and means for controlling the degree of low pressure in said passageways.

ALBERT O. PRICE.